US011994475B2

(12) United States Patent
Hall et al.

(10) Patent No.: US 11,994,475 B2
(45) Date of Patent: May 28, 2024

(54) CONNECTION VERIFIER (71) Applicant: Oetiker NY, Inc., Lancaster, NY (US)

(72) Inventors: Thomas Edwin Hall, Buffalo, NY (US); Lawrence Butts, Shelby Township, MI (US)

(73) Assignee: Oetiker NY, Inc., Lancaster, NY (US)

( * ) Notice: Subject to any disclaimer, the term of this patent is extended or adjusted under 35 U.S.C. 154(b) by 637 days.

(21) Appl. No.: 17/253,665

(22) PCT Filed: Jun. 25, 2018

(86) PCT No.: PCT/US2018/039320
§ 371 (c)(1),
(2) Date: Dec. 18, 2020

(87) PCT Pub. No.: WO2020/005197
PCT Pub. Date: Jan. 2, 2020

(65) Prior Publication Data
US 2021/0262943 A1 Aug. 26, 2021

(51) Int. Cl.
*G01N 21/88* (2006.01)
*F16L 37/088* (2006.01)
*F16L 37/14* (2006.01)
*G01N 21/952* (2006.01)

(52) U.S. Cl.
CPC ...... *G01N 21/8806* (2013.01); *F16L 37/0885* (2019.08); *F16L 37/144* (2013.01); *G01N 21/952* (2013.01); *F16L 2201/10* (2013.01)

(58) Field of Classification Search
CPC .............. G01N 21/8806; G01N 21/952; F16L 37/0885; F16L 37/144; F16L 2201/10; F16L 37/088
USPC .......................................................... 73/40
See application file for complete search history.

(56) References Cited

U.S. PATENT DOCUMENTS

| 7,316,428 B2 * | 1/2008 | Takayanagi | F16L 3/1226 |
| | | | 285/87 |
| 2008/0007053 A1 * | 1/2008 | Kerin | F16L 37/0885 |
| | | | 285/305 |
| 2008/0026647 A1 * | 1/2008 | Boehnlein | H01R 13/5205 |
| | | | 439/210 |
| 2009/0217954 A1 * | 9/2009 | Hall | G01B 11/245 |
| | | | 134/115 R |
| 2010/0276924 A1 * | 11/2010 | Gillet | F16L 37/144 |
| | | | 285/93 |
| 2014/0338699 A1 | 11/2014 | Bassett | |
| 2015/0330860 A1 | 11/2015 | Koyanagi | |
| 2016/0290540 A1 * | 10/2016 | Kishi | F16L 1/09 |
| 2017/0363237 A1 | 12/2017 | Pepe et al. | |
| 2017/0370691 A1 | 12/2017 | Leys et al. | |

FOREIGN PATENT DOCUMENTS

| CN | 101938933 | 1/2011 | |
| CN | 104266030 | 1/2015 | |
| EP | 2184600 A2 * | 5/2010 | ............. G01N 21/88 |

(Continued)

*Primary Examiner* — Marrit Eyassu
(74) *Attorney, Agent, or Firm* — Harter Secrest & Emery LLP; Michael Nicholas Vranjes (57) ABSTRACT A connection verifier, including a housing including, a handle, and a head arranged to engage a fluid connection and having a cutout, and at least one camera arranged in the housing and directed toward the cutout.

18 Claims, 9 Drawing Sheets (56) References Cited

FOREIGN PATENT DOCUMENTS

| EP | 3056783 | 8/2016 | |
|----|---------|--------|---|
| JP | 3568947 | 9/2004 | |
| JP | 5161969 B2 * | 3/2013 | ......... G01N 21/8803 |
| JP | 2016206044 | 12/2016 | |
| JP | 2018013436 | 1/2018 | |

* cited by examiner

CONNECTION VERIFIER

CROSS-REFERENCE TO RELATED APPLICATIONS

The present application is the United States National Stage Application pursuant to 35 U.S.C. § 371 of International Patent Application No. PCT/US2018/039320, filed on Jun. 25, 2018, which application is incorporated herein by reference in its entirety.

FIELD

The present disclosure relates to a connection verifier for a fluid connection, and, more particularly, to a connection verifier that indicates the status of a connection both on site and at a remote location, via wireless transmission.

BACKGROUND

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip or snap ring carried on the fluid connector which is adapted to snap behind a raised shoulder of a tube end form when the tube end form is fully inserted into the fluid connector. If the tube end form is not fully inserted into the fluid connector, the fluid connection may fail causing fluids to leak out and other more serious consequences.

Thus, there has been a long-felt need for a connection verifier to ensure that a fluid connection is securely connected.

SUMMARY

According to aspects illustrated herein, there is provided a connection verifier, comprising a housing including, a handle, and a head arranged to engage a fluid connection and having a cutout, and at least one camera arranged in the housing and directed toward the cutout.

According to aspect illustrated herein, there is provided a connection verifier, comprising a housing, including a first outer shell, a first inner shell connected to the first outer shell, and a head including a cutout, and one or more engagement members arranged to engage a fluid connection, one or more cameras arranged radially between the first outer shell and the first inner shell, and in a direction of the cutout to view the fluid connection, and one or more lights arranged in the housing.

According to aspects illustrated herein, there is provided a connection verifier, comprising a handle, including a first end, a second end, a first outer shell, and a first inner shell connected to the first outer shell, a head, including a third end connected to the second end; a fourth end, a second outer shell, and a second inner shell connected to the second outer shell and having a cutout, an engagement plate, including a first surface connected to the fourth end; a second surface, and one or more engagement members connected to the second surface and arranged to engage a fluid connection, and one or more cameras arranged radially between the first outer shell and the first inner shell, and in a direction of the cutout to view the fluid connection.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1:
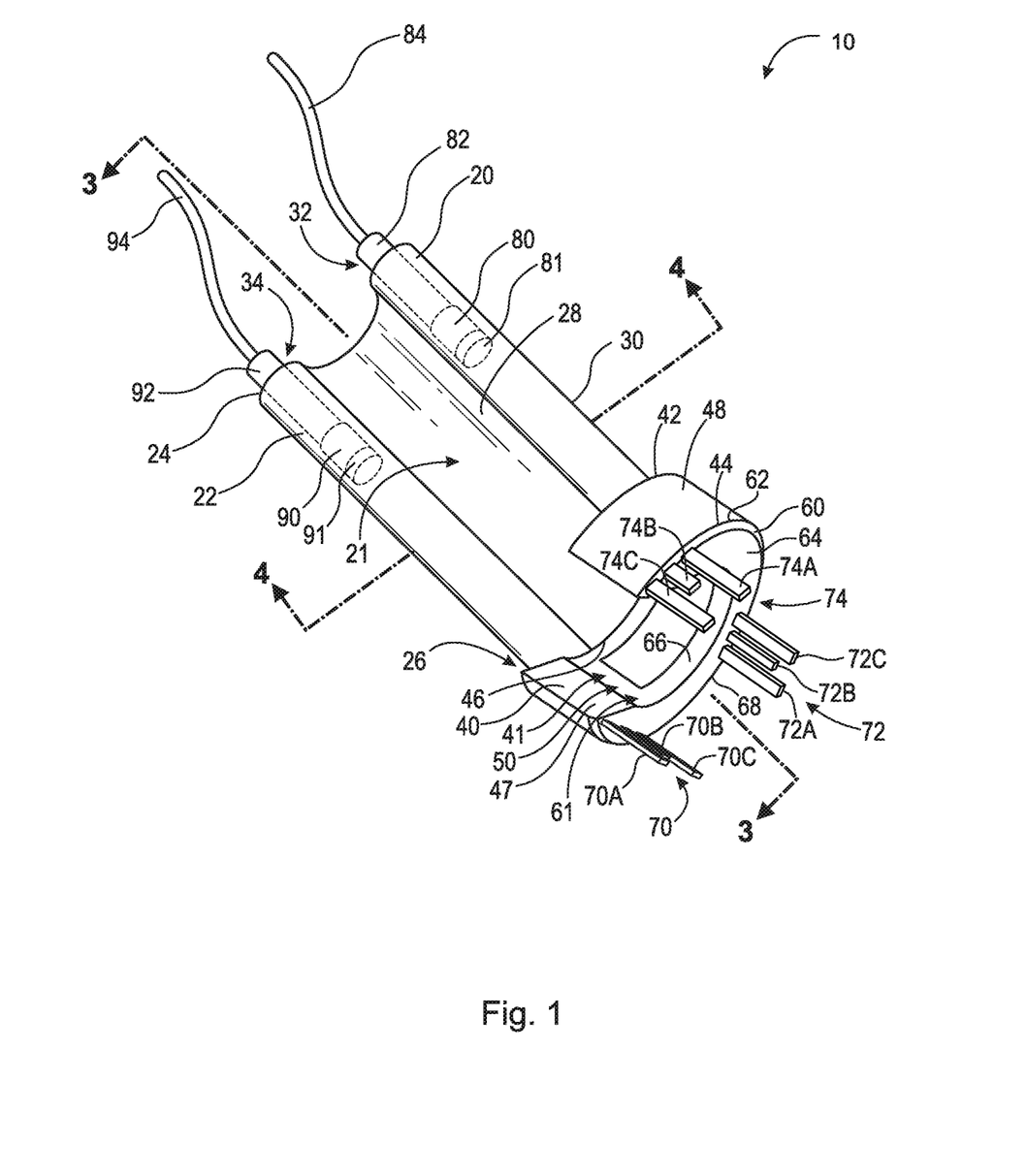
FIG. 1 is a perspective view of a connection verifier.
Figure 2A:
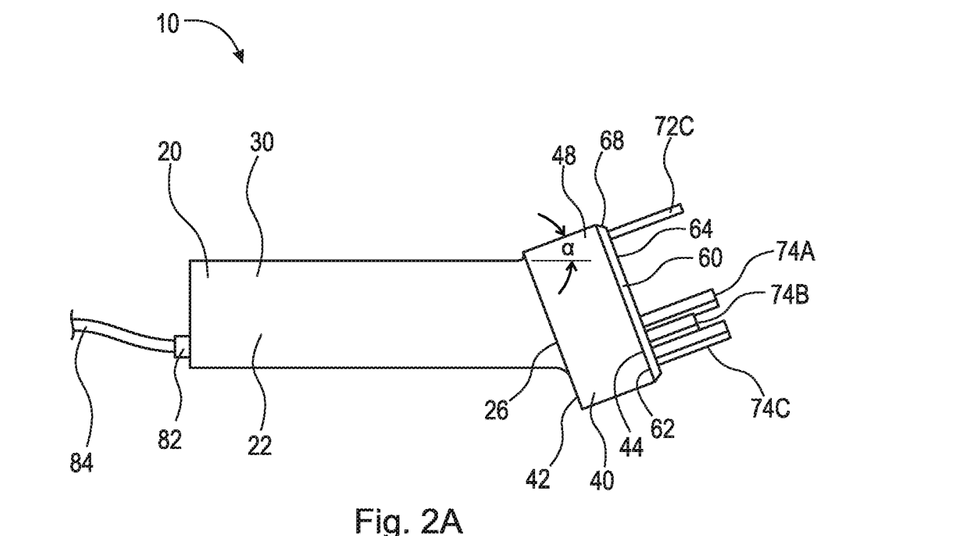
FIG. 2A is a front elevational view of the connection verifier shown in FIG. 1.
Figure 2B:
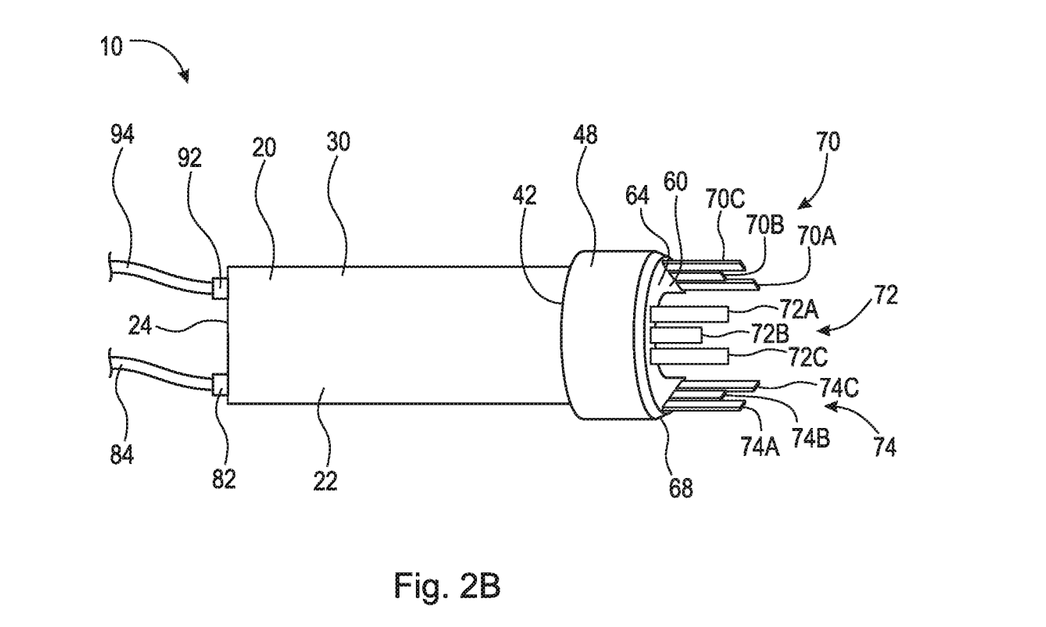
FIG. 2B is a top elevational view of the connection verifier shown in FIG. 1.
Figure 2C:
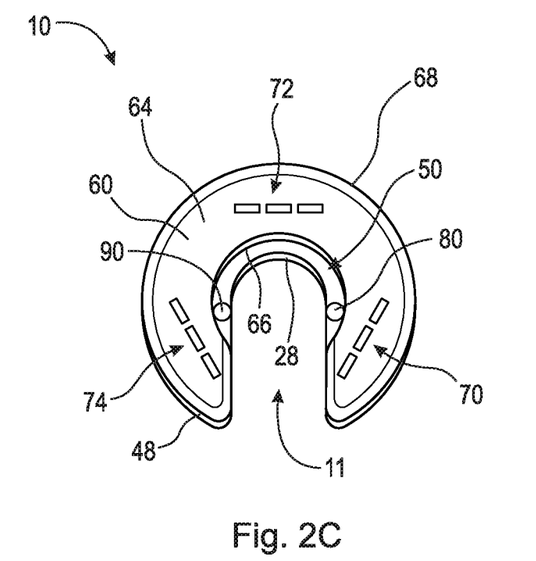
FIG. 2C is a right side elevational view of the connection verifier shown in FIG. 1.
Figure 2D:
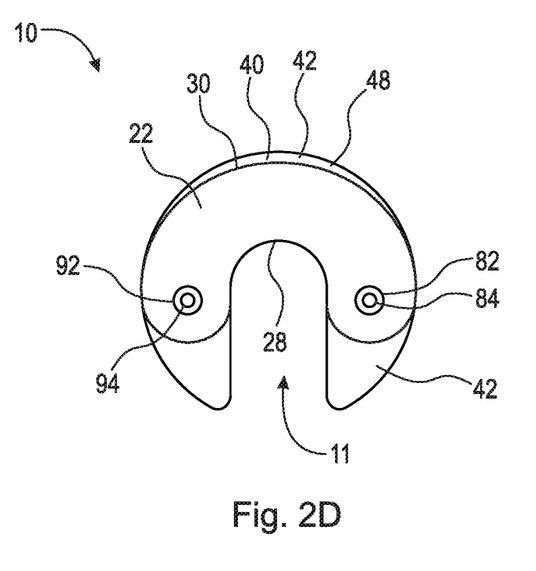
FIG. 2D is a left side elevational view of the connection verifier shown in FIG. 1.

Adverting now to the figures, FIG. 1 is a perspective view of connection verifier 10. FIG. 2A is a front elevational view of connection verifier 10. FIG. 2B is a top elevational view of connection verifier 10. FIG. 2C is a right side elevational view of connection verifier 10. FIG. 2D is a left side elevational view of connection verifier 10. Connection verifier 10 generally comprises housing 20, engagement plate 60, opening 11, and one or more cameras. In the embodiment shown in the figures, connection verifier comprises cameras 80 and 90. It should be appreciated that connection verifier 10 may be integrally formed or formed by connecting separate components.

Housing 20 comprises handle 22 and head 40. Handle 22 includes opening 21, end 24, end 26, inner shell 28, and outer shell 30. Inner shell 28 is a curved shell and is arranged radially inward from curved outer shell 30. Inner shell 28 is connected to outer shell 30. Inner shell 28 open to form opening 21. Opening 21 allows clearance between handle 22 and tube end form 120, as will be discussed in greater detail below. In an example embodiment, housing 20 does not comprise opening 21. In the embodiment shown, inner shell 28 is substantially parallel to outer shell 30. In an example embodiment, inner shell 28 is substantially non-parallel to outer shell 30. The space between inner shell 28 and outer shell 30 may be at least partially filled with material, or completely empty of material (i.e., hollow). In an example embodiment, the space between inner shell 28 and outer shell 30 is at least partially filled with material proximate end 24. In the embodiment shown, handle 22 is generally U-shaped. It should be appreciated, however, that handle 22 may comprise any shape suitable for housing one or more cameras and allowing the proper line of sight to verify a fluid connection (e.g., rectangular, ovular, square, trapezoidal, parallelogram-shaped, triangular, etc.). End 24 comprises holes 32 and 34. Camera 80 is arranged in hole 32 and camera 90 is arranged in hole 34. Camera 80 comprises conduit 82 and wire 84. Camera 80 may further comprise light 81. Camera 90 comprises conduit 92 and wire 94. Camera 90 may further comprise light 91. In an example embodiment, connection verifier 10 comprises one camera arranged in one hole in end 24. In an example embodiment, connection verifier 10 comprises three cameras arranged in three respective holes in end 24. It should be appreciated that connection verifier 10 may comprise any number of cameras arranged at any location therein suitable for verifying a fluid connection. Cameras 80 and 90 are directed toward head 40, specifically cutout 50, as will be discussed in greater detail below. As previously mentioned, connection verifier 10 further comprises lights 81 and 91. In the embodiment shown, lights 81 and 91 are arranged proximate cameras 80 and 90 and are directed toward cutout 50 and engagement plate 60 such that sufficient light is available for cameras 80 and 90 to optically verify a secure connection. Lights 81 and 91 may be any suitable light device, such as incandescent lamps, gas-discharge lamps, arc lamps, and light-emitting diodes (LEDs). In an example embodiment, connection verifier 10 comprises one or more lights. It should be appreciated that any number of lights suitable to provide enough light to optically view the connection may be used. It should also be appreciated that the one or more lights may be positioned at any location in connection verifier 10 suitable to provide enough light to optically view the fluid connection.

Head 40 includes opening 41, end 42, end 44, radially inward facing surface 46, inner shell 47, outer shell 48, and cutout 50. End 42 is connected to end 26. Radially inward facing surface 46 and inner shell 47 are arranged radially inward from outer shell 48. Cutout 50 is arranged in inner shell 47 and extends axially between radially inward facing surface 46 and end 44. Radially inward facing surface and inner shell 47 open to form opening 41. Opening 41 is arranged to engage tube end form 120 of fluid connection 160, as will be discussed in greater detail below. Head 40 is arranged at angle α relative to handle 22. Specifically, outer shell 48, inner shell 47, and radially inward facing surface 66 of engagement plate are arranged at angle α relative to outer/inner shell 30. Angle α is arranged such that cameras 80 and 90 (and lights 81 and 91) have a direct line of sight at the space between fluid connector 140 and tube end form 120, as will be discussed in greater detail below. Specifically, angle α is arranged such that cameras 80 and 90 can view snap ring 150 in the space between fluid connector 140 and tube end form 120. In an example embodiment, angle α is greater than or equal to 0 degrees and less than or equal to 90 degrees. In an example embodiment, angle α is greater than or equal to 10 degrees and less than or equal to 20 degrees.

Engagement plate 60 comprises opening 61, surface 62, surface 64, radially inward facing surface 66, and radially outward facing surface 68. Surface 62 is connected to end 44. Radially inward facing surface 66 is arranged radially inward from radially outward facing surface 68. Radially inward facing surface 66 is connected to radially outward facing surface 68. Radially inward facing surface 66 opens to form opening 61. Opening 61 is arranged to engage tube end form 120 of fluid connection 160, as will be discussed in greater detail below. In an example embodiment, radially inward facing surface 66 is aligned with radially inward facing surface 46, along an axial axis. In an example embodiment, radially inward facing surface 66 is not aligned with radially inward facing surface 46, along an axial axis. Surface 64 is arranged to engage end 141 of fluid connector 140 (see FIG. 5). When end 141 abuts against surface 64, tube end form 120 rests against radially inward facing surface 46. Engagement plate 60 may further comprise one or more engagement members. In the embodiment shown, engagement plate 60 comprises engagement member 70, engagement member 72, and engagement member 74. Engagement members 70, 72, and 74 are connected to and extend from surface 64. In an example embodiment, connection verifier 10 includes one or more engagement members. In the embodiments having one or more engagement members, fluid connection 160 is properly aligned such that the one or more cameras are able to find at least two of the protrusions of the snap ring, as will be discussed in greater detail below. In an example embodiment, connection verifier 10 does not include any engagement members. In this example embodiment, fluid connection 160 can be continuously rotated to find at least two of the protrusions of the snap ring, as will be discussed in greater detail below.

Engagement member 70 comprises one or more prongs. In the embodiment shown, engagement member 70 comprises prongs 70A, 70B, and 70C. Prongs 70A-C are any pointed, projecting part used to align or hold an fluid connection. Prongs 70A-C may be tapered, include locking tabs on the distal ends, and be any suitable geometric shape (e.g., ovular, rectangular, trapezoidal, arcuate, etc.). Prongs 70A and 70C are substantially similar. Prong 70B is arranged between prongs 70A and 70C. Prong 70B is shorter in length than prongs 70A and 70C. In an example embodiment, prong 70B comprises a length that is approximately 75% of the length of prongs 70A and 70C. Engagement member 70 is arranged to engage a corner of the hexagonal head of a fluid connection. Specifically, prongs 70A and 70C are designed to engage either side of a corner of hexagonal head, as will be discussed in greater detail below. Prong 72B comprises a protrusion at its distal end and is arranged to engage a groove adjacent to hexagonal head 154. Prong 72B is arranged to "grip" and locate the fluid connector. Engagement member 70 is arranged to align the fluid connection such that the one or more cameras can find at least two of the protrusions of the snap ring of the fluid connection. It should be appreciated that engagement member 70 can be arranged to align any fluid connection, for example, a fluid connection having a square head or an octagonal head, or any other fluid connection known in the art.

Engagement member 72 comprises one or more prongs. In the embodiment shown, engagement member 72 comprises prongs 72A, 72B, and 72C. Prongs 72A-C are any pointed, projecting part used to align or hold an fluid connection. Prongs 72A-C may be tapered, include locking tabs on the distal ends, and be any suitable geometric shape (e.g., ovular, rectangular, trapezoidal, arcuate, etc.). Prongs 72A and 72C are substantially similar. Prong 72B is arranged between prongs 72A and 72C. Prong 72B is shorter in length than prongs 72A and 72C. In an example embodiment, prong 72B comprises a length that is approximately 75% of the length of prongs 72A and 72C. Engagement member 72 is arranged to engage a corner of the hexagonal head of a fluid connection. Specifically, prongs 72A and 72C are designed to engage either side of a corner of hexagonal head, as will be discussed in greater detail below. Prong 72B comprises a protrusion at its distal end and is arranged to engage a groove adjacent to hexagonal head 154. Prong 72B is arranged to "grip" and locate the fluid connector. Engagement member 72 is arranged to align the fluid connection such that the one or more cameras can find at least two of the protrusions of the snap ring of the fluid connection. It should be appreciated that engagement member 72 can be arranged to align any fluid connection, for example, a fluid connection having a square head or an octagonal head, or any other fluid connection known in the art.

Engagement member 74 comprises one or more prongs. In the embodiment shown, engagement member 74 comprises prongs 74A, 74B, and 74C. Prongs 74A-C are any pointed, projecting part used to align or hold an fluid connection. Prongs 74A-C may be tapered, include locking tabs on the distal ends, and be any suitable geometric shape (e.g., ovular, rectangular, trapezoidal, arcuate, etc.). Prongs 74A and 74C are substantially similar. Prong 74B is arranged between prongs 74A and 74C. Prong 74B is shorter in length than prongs 74A and 74C. In an example embodiment, prong 74B comprises a length that is approximately 75% of the length of prongs 74A and 74C. Engagement member 74 is arranged to engage a corner of the hexagonal head of a fluid connection. Specifically, prongs 74A and 74C are designed to engage either side of a corner of hexagonal head, as will be discussed in greater detail below. Prong 72B comprises a protrusion at its distal end and is arranged to engage a groove adjacent to hexagonal head 154. Prong 72B is arranged to "grip" and locate the fluid connector. Engagement member 74 is arranged to align the fluid connection such that the one or more cameras can find at least two of the protrusions of the snap ring of the fluid connection. It should be appreciated that engagement member 74 can be arranged to align any fluid connection, for example, a fluid connection having a square head or an octagonal head, or any other fluid connection known in the art.

Figure 3:
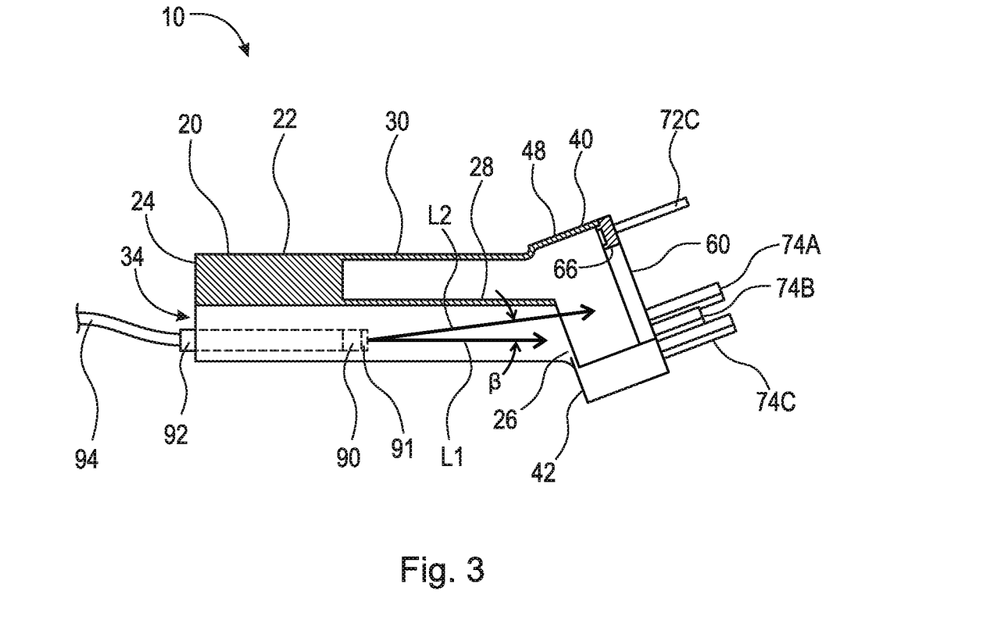
FIG. 3 is a cross-sectional view of the connection verifier taken generally along line 3-3 in FIG. 1.

FIG. 3 is a cross-sectional view of connection verifier 10 taken generally along line 3-3 in FIG. 1. Camera 90 having light 91, conduit 92, and wire 94 is shown in hidden lines. As shown, conduit 92 is arranged in hole 34 in end 24. Camera 90 is directed such that its line of sight (shown by line L1) extends out of cutout 50. Line L1 is substantially parallel to inner shell 28 and outer shell 30. Line L1 is arranged to extend out of cutout 50 between inner shell 28 and radially inward facing surface 66. In an example embodiment, camera 90 may be positioned at angle β relative to inner shell 28 and outer shell 30 (shown by line L2).

Figure 4:
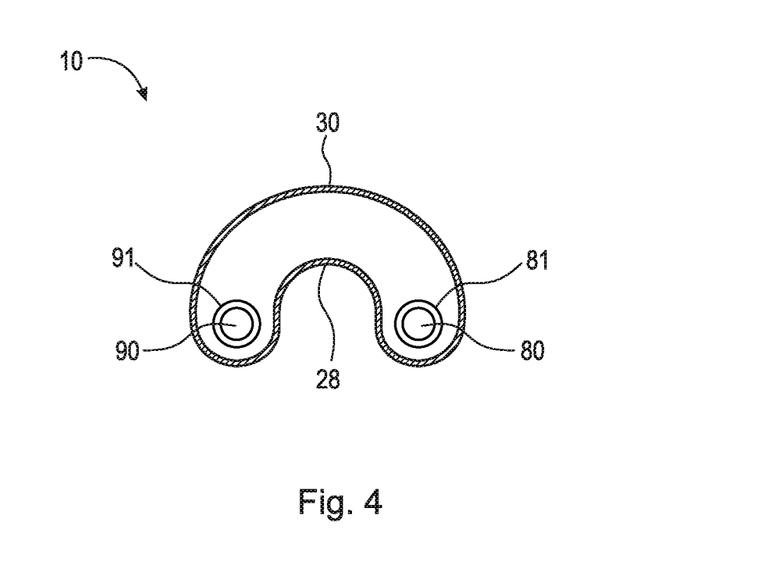
FIG. 4 is a cross-sectional view of the connection verifier taken generally along line 4-4 in FIG. 1.

FIG. 4 is a cross-sectional view of connection verifier 10 taken generally along line 4-4 in FIG. 1. Cameras 80 and 90 are any optical instrument for recording or capturing images, which may be stored locally, transmitted to another location, or both. The images may be individual still photographs or sequences of images constituting videos or movies. In an example embodiment, cameras 80 and 90 are endoscope cameras. In an example embodiment, cameras 80 and 90 are optic bore scopes with external cameras. Cameras 80 and 90 may be connected to a monitor or a computer via wires 84 and 94, respectively. A user or a computer program can determine that a fluid connection is properly connected by, for example, ensuring that at least two projections of a snap ring are visible over the shoulder of a tube end form, as will be discussed in greater detail below. In this example, a computer program having feature recognition for finding and confirming the existence of snap ring protrusions may be used. In an example embodiment, cameras 80 and 90 are wireless and further comprise one or more transmission devices that send the images to a remote location, as will be discussed in greater detail below. A user or a computer program at the remote location may verify a secure connection.

As previously mentioned, connection verifier 10 may further comprise a transmission device that is electrically connected to camera 80 and/or camera 90 and optionally a memory device and/or a microcontroller. The transmission device is arranged to transmit an image, video, and/or a signal to a remote location indicating that a fluid connection is secure, or unsecure. For example, a programmable computer connected to cameras 80 and/or 90 may determine that at least two protrusions of snap ring 150 are visibly "snapped" over shoulder 127 (see FIG. 9) and then send a signal via a transmission device to a remote location indicating a verified fluid connection. This verification can of course be done manually by the user via a monitor, screen, or computing device. In an example embodiment, the transmission device is arranged to send a signal via an electrical cable such as a wire or a fiber optic cable (i.e., a physical form of connection). The transmission device may use inter-integrated circuit ($I^2C$), controller area network (CAN), local interconnect network (LIN), or any suitable communication protocol known in the art. In an example embodiment, the transmission device is arranged to send a wireless communication to a receiver at a remote location which records the data sent (i.e., whether the fluid connection is securely connected, or not). The transmission device may transmit the data using any suitable method known in the art, for example, Bluetooth® communication, radio frequency, infrared, and Wi-Fi® communication. In an example embodiment, the transmission device may transmit the fluid connection identification number, the connection verifier identification number, the remaining life of the connection verifier, the vehicle identification number (VIN), the part number (e.g., engine, radiator, etc.) and serial number for that part, verification that a fluid connection is secure, and/or verification that a fluid connection is not secure. In an example embodiment, connection verifier can operate in conjunction with another device, such as a computer, to allow an electronic record to be kept of each inspection, and print a pass/fail label.

Connection verifier 10 may further comprise a tool failure indicator, such as a light, a vibration device, or a sound device, to indicate that connection verifier 10 should be replaced. In this embodiment, connection verifier 10 could, for example, include a memory device or a microcontroller that is programmed with a predefined number, such that when connection verifier 10 is used a number of times equal to that predefined number, the tool failure indicator activates (i.e., the light turns on, the vibration device vibrates, the sound device creates a sound). The microcontroller may also tally the number of times connection verifier 10 is used, and using a preset remaining life calculation with a safety factor, continuously determine the remaining life of connection verifier.

Figure 5:
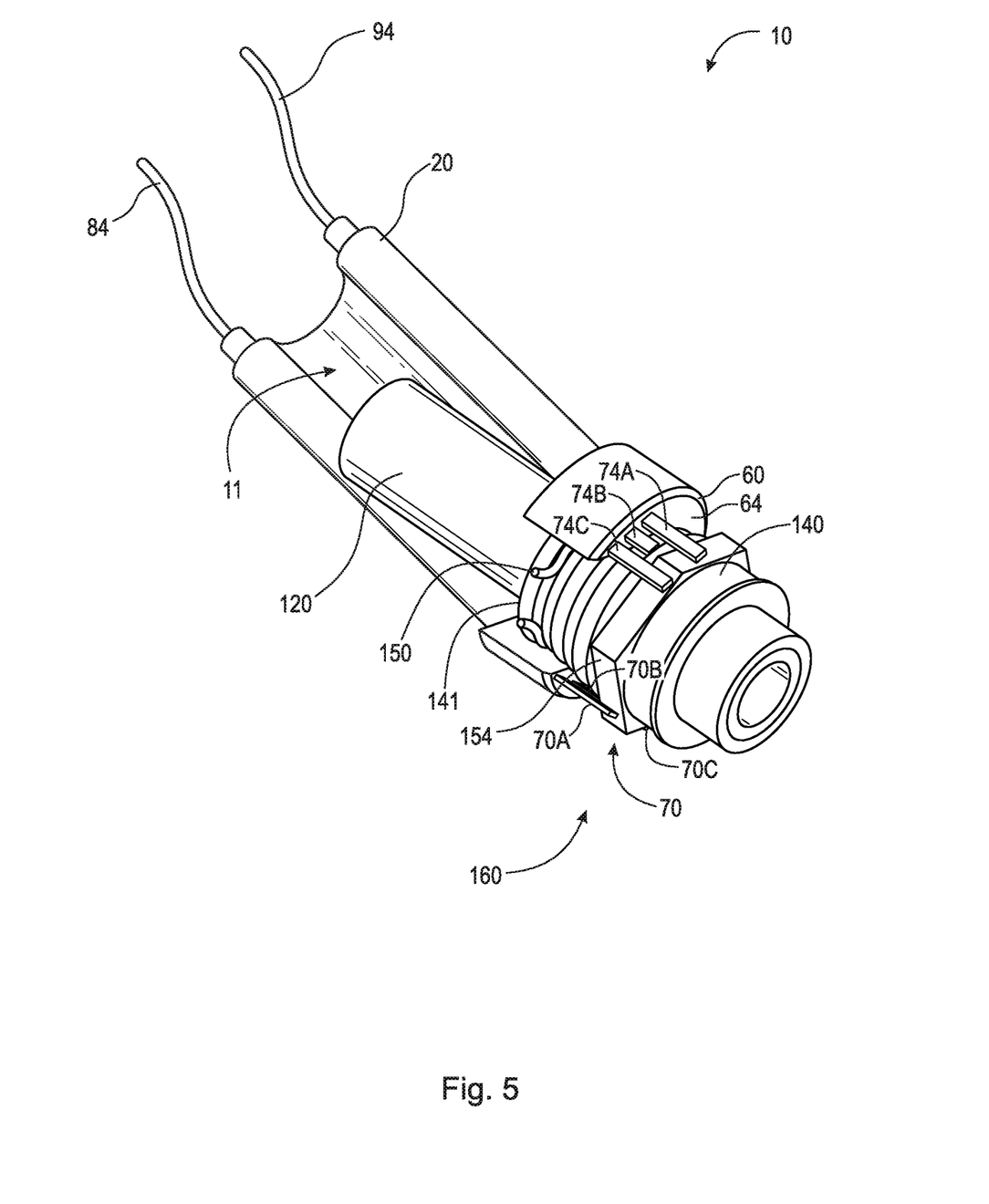
FIG. 5 is a perspective view of the connection verifier shown in FIG. 1 engaged with a fluid connection.
Figure 6:
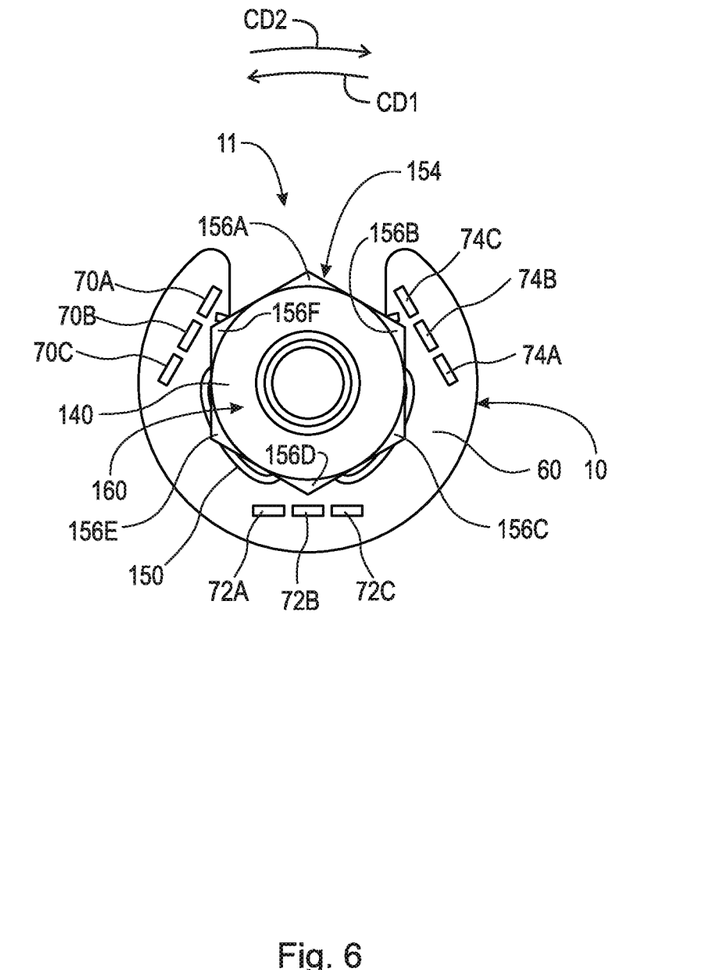
FIG. 6 is a right side view of the connection verifier engaged with the fluid connection shown in FIG. 5.

FIG. 5 is a perspective view of connection verifier 10 shown in FIG. 1 engaged with fluid connection 160. FIG. 6 is a right side view of connection verifier 10 engaged with fluid connection 160 shown in FIG. 5. Fluid connection 160 generally comprises tube end form 120, fluid connector 140, and snap ring 150. Fluid connections using tube end forms, fluid connectors, and snap rings are known in the art. When fully engaged, end 141 of fluid connector 140 abuts against surface 64 and engagement members engage respective corners of hexagonal head 154. For example, as shown in FIG. 6, prongs 70A-C are engaged with corner 156F, prongs 72A-C are engaged with corner 156D, and prongs 74A-C are engaged with corner 156B. Engagement members may also be arranged to engage respective sides (instead of corners) of hexagonal head.

Figure 7:
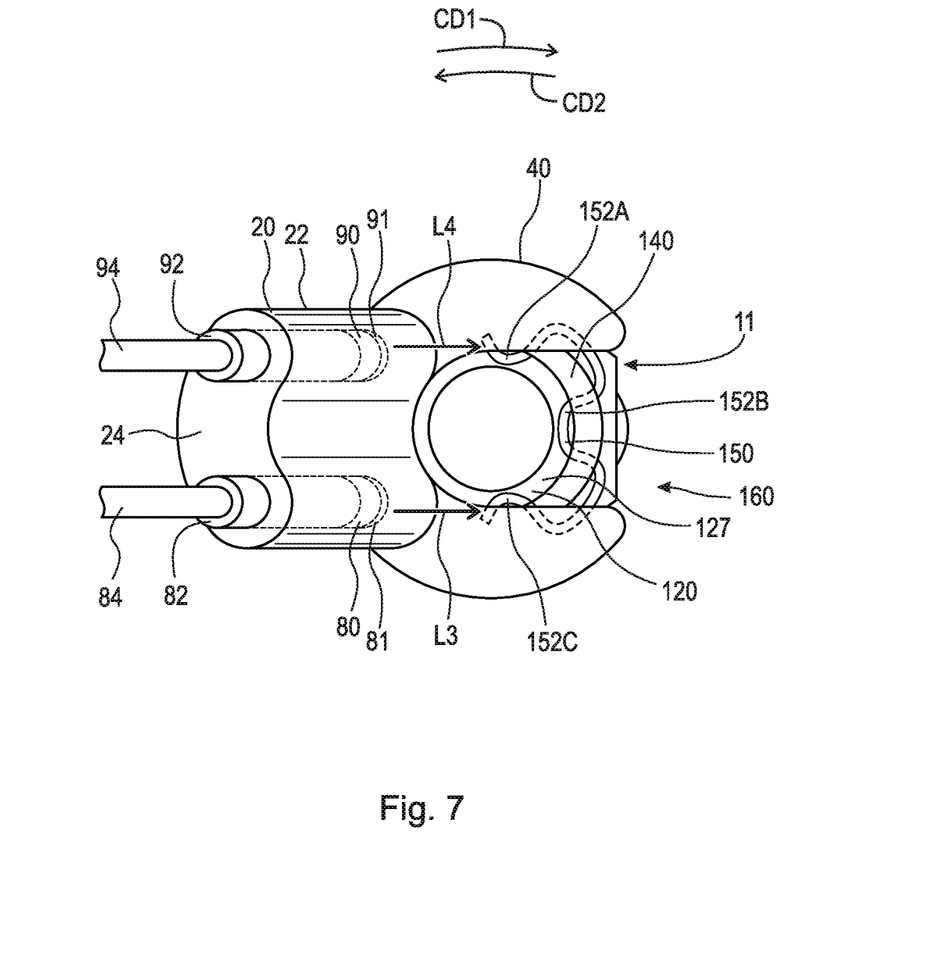
FIG. 7 is a left side view of the connection verifier engaged with the fluid connection shown in FIG. 5.

FIG. 7 is a left side view of connection verifier 10 engaged with the fluid connection 160 shown in FIG. 5. As shown, camera 80 is directed toward fluid connection 160 (as shown by line L3) and indicates that protrusion 152C is secured on (i.e., snapped over) shoulder 127 of tube end form 120. Camera 90 is directed toward fluid connection 160 (as shown by line L4) and indicates that protrusion 152A is secured on (i.e., snapped over) shoulder 127 of tube end form 120. Connection verifier 10 can be rotated in a circumferential direction such that engagement members engage different corners of hexagonal head 154, thereby verifying different protrusions are secured over shoulder. However, cameras 80 and 90 should be arranged such that at least two of protrusions 152A-C are viewable. The reason for this is that typically, verifying that at least two of protrusions 152A-C are secured on shoulder 127 ensures a secure connection between tube end form 120 and fluid connector 140. It should be appreciated that cameras can be arranged such that all three of protrusions 152A-C are viewable. In a one camera version of connection verifier 10, for example, at least one of protrusions 152A-C is visible from all six hexagonal faces, and two of protrusions 152A-C are visible on every other hexagonal face. It should be appreciated that, instead of individual engagement members and prongs, a sleeve can be arranged on surface 64 to engage hexagonal head 154. The sleeve can be rotated relative to hexagonal head to engage therewith at various angles.

Figure 8:
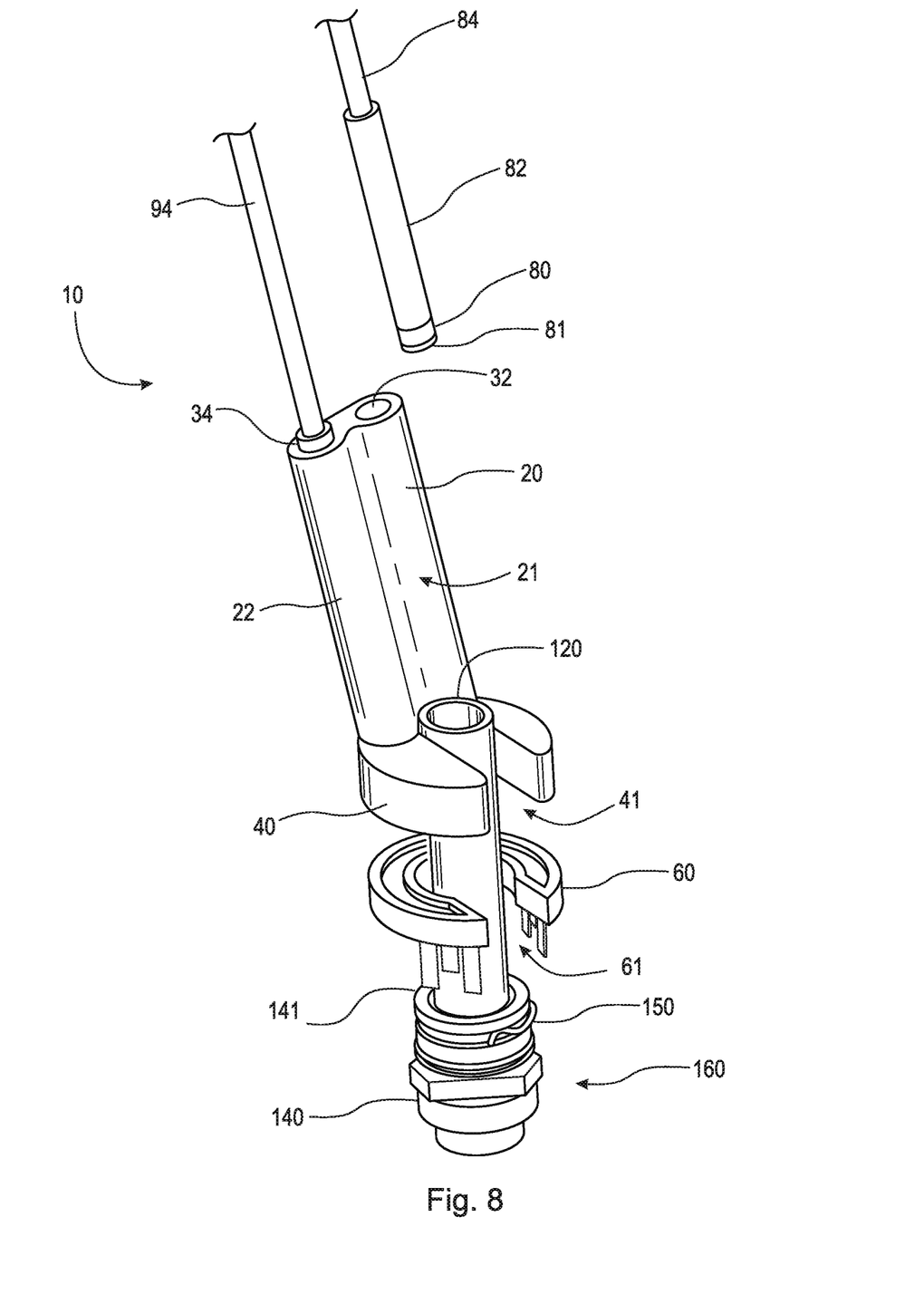
FIG. 8 is an exploded view of the connection verifier partially engaged with the fluid connection shown in FIG. 5; and, FIG. 9 is a cross-sectional view of the fluid connection shown in FIG. 5.

FIG. 8 is an exploded view of connection verifier 10 partially engaged with fluid connection 160. As shown, tube end form 120 is arranged in openings 21, 41, and 61 (which form opening 11 of connection verifier 20). Engagement plate 60 is rotated circumferentially until the engagement members are properly aligned with respective corners or respective sides of hexagonal head 154. When end 141 abuts against surface 64 of engagement plate 60, tube end form 120 is in contact with radially inward facing surface 46, but a radial space exists between tube end form 120 and radially inward facing surface 66. This radial space allows cameras 80 and 90 to view snap ring 150 radially between tube end form 120 and fluid connector 140.

Figure 9:
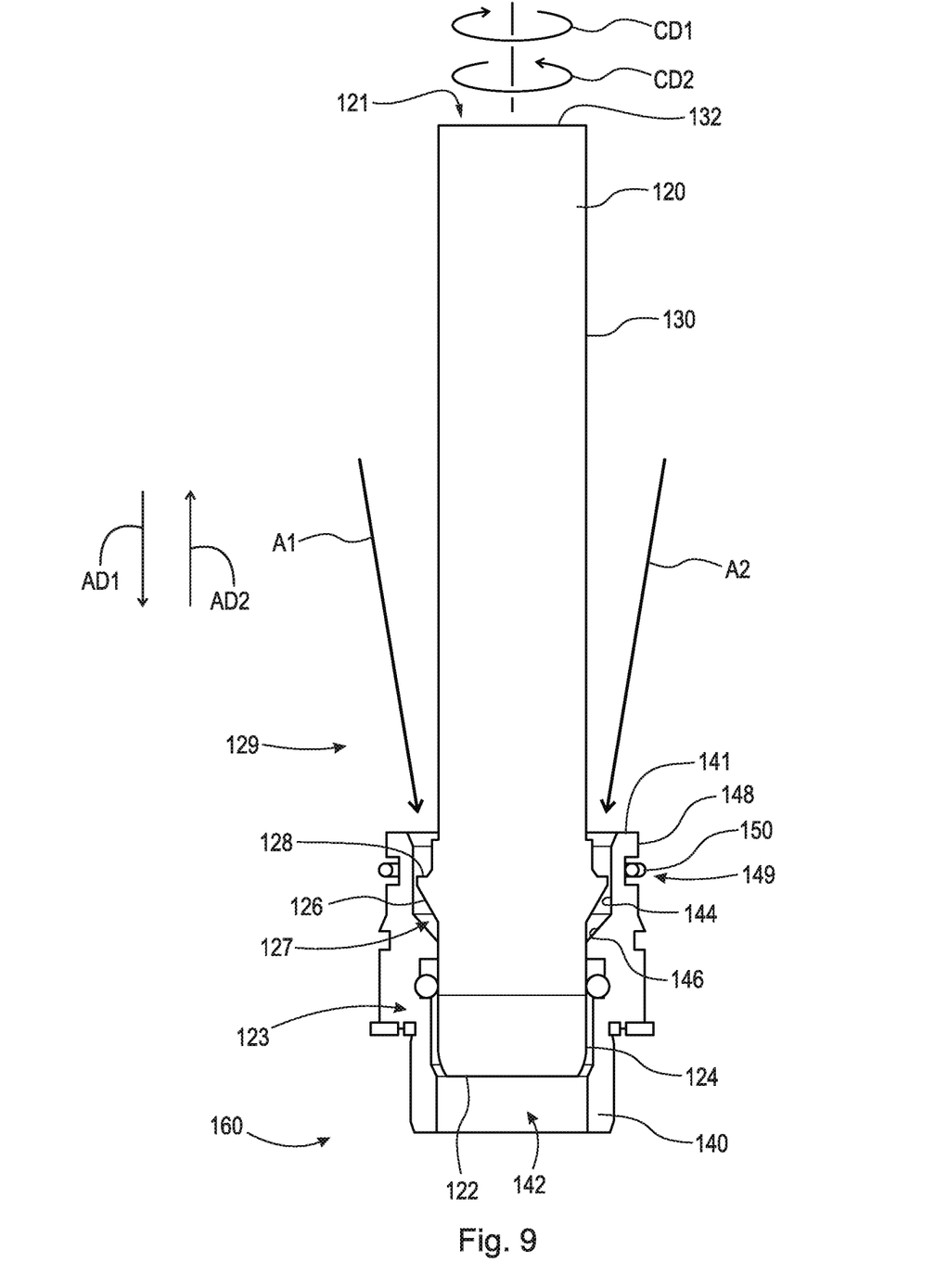

FIG. 9 is a cross-sectional view of fluid connection 160 shown in FIG. 5. As previously discussed, fluid connection 160 generally comprises tube end form 120, fluid connector 140, and snap ring 150. Fluid connections having a tube end form, a fluid connector and snap ring are known in the art.

Tube end form 120 comprises end 122, section 123, shoulder 127, section 129, end 132, and through-bore 121. Through-bore 121 extends through tube end form 120 from end 122 to end 132. Section 123 is arranged between end 122 and shoulder 127 and comprises radially outward facing surface 124. Radially outward facing surface 124 includes a substantially constant diameter. Shoulder 127 is arranged between section 123 and section 129 and comprises radially outward facing surface 126. Radially outward facing surface 126 is a linear conical shape and increases in diameter in axial direction AD2. Section 129 is arranged between shoulder 127 and end 132 and comprises radially outward facing surface 130. Radially outward facing surface 130 includes a substantially constant diameter. Shoulder 127 is connected to radially outward facing surface 130 via shoulder surface 128. Tube end form 120 is arranged to be inserted, specifically with end 122 first, into fluid connector 140. Tube end form 120 may utilize a straight ramp (i.e., constant linear ramp) or a variable diameter ramp, and is inserted into fluid connector 140 until snap ring 150 snaps over shoulder 127. It should be appreciated that tube end form 120 may be any traditional tube end form comprising a ramp, which extends radially outward and axially on the outer surface of the tube end form, to displace a snap ring or wire clip within the fluid connector to secure the tube end form within the fluid connector. In order to determine that fluid connection 160 is securely connected, connection verifier 10 essentially verifies that snap ring 150 has "snapped" over shoulder 127.

Fluid connector 140 comprises end 141, through-bore 142, radially inward facing surface 144, radially inward facing surface 146, and radially outward facing surface 148. Radially outward facing surface 148 comprises groove 149. Snap ring 150 is arranged in groove 149. Snap ring 150 comprises protrusions 152A, 152B, and 152C (see FIG. 9). Protrusions 152A-C extend radially inward through holes in groove 149 to engage shoulder 127, specifically, shoulder surface 128. Fluid connections that utilize snap rings arranged on fluid connectors to engage tube end forms are known in the art.

To verify that fluid connection 160 is securely connected, connection verifier 10 is first arranged around tube end form 120 with cameras directed toward the radial space between fluid connector 140 and tube end form 120, as indicated by arrows A1 and A2. Through this radial space, cameras 80 and 90 can verify that at least two of protrusions 150A-C are secured over shoulder 127, thus verifying a secure connection between tube end form 120 and fluid connector 140.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Connection verifier
11 Opening
20 Housing
21 Opening
22 Handle
24 End
26 End
28 Inner shell
30 Outer shell
32 Hole
34 Hole
40 Head
41 Opening
42 End
44 End
46 Radially inward facing surface
47 Inner shell
48 Outer shell
50 Cutout
60 Engagement plate
61 Opening
62 Surface
64 Surface
66 Radially inward facing surface
68 Radially outward facing surface
70 Engagement member
70A Prong
70B Prong
70C Prong
72 Engagement member
72A Prong
72B Prong
72C Prong
74 Engagement member
74A Prong
74B Prong
74C Prong
80 Camera
81 Light
82 Conduit
84 Wire
90 Camera
91 Light
92 Conduit
94 Wire
120 Tube end form
121 Through-bore
122 End
123 Section
124 Radially outward facing surface
126 Radially outward facing surface
127 Shoulder
128 Shoulder surface
129 Section
130 Radially outward facing surface
132 End
140 Fluid connector
141 End
142 Through-bore
144 Radially inward facing surface
146 Radially inward facing surface
148 Radially outward facing surface
149 Groove
150 Snap ring
152A Protrusion
152B Protrusion
152C Protrusion
154 Hexagonal head
156A Corner
156B Corner
156C Corner
156D Corner
156E Corner
156F Corner
160 Fluid connection
AD1 Axial direction
AD2 Axial direction
CD1 Circumferential direction
CD2 Circumferential direction
L1 Line
L2 Line
A1 Arrow
A2 Arrow
α Angle
β Angle

What is claimed is:

1. A connection verifier, comprising:
    a housing including:
        a handle comprising an inner shell and an outer shell; and
        a head arranged to engage a fluid connection and having a cutout;
    at least one camera arranged in the housing radially between the inner shell and the outer shell and directed toward the cutout; and
    an engagement plate connected to the head, the engagement plate arranged to engage a fluid connector of the fluid connection.

2. The connection verifier as recited in claim 1, wherein the engagement plate comprises one or more engagement members arranged to align the fluid connector.

3. The connection verifier as recited in claim 1, further comprising at least one light arranged in the housing and directed toward the cutout.

4. The connection verifier as recited in claim 1, wherein the head is arranged at an angle relative to the handle.

5. A connection verifier, comprising:
    a housing, including:
        a first outer shell;
        a first inner shell connected to the first outer shell; and
        a head including:
            a cutout; and
            one or more engagement members arranged to engage a fluid connection;
    one or more cameras arranged:
        radially between the first outer shell and the first inner shell; and
        in a direction of the cutout to view the fluid connection; and
    one or more lights arranged in the housing.

6. The connection verifier as recited in claim 5, wherein the head comprises:
- a first end connected to the housing;
- a second end including the one or more engagement members protruding therefrom;
- a second outer shell; and
- a second inner shell connected to the second outer shell and having the cutout.

7. The connection verifier as recited in claim 6, wherein each of the one or more engagement members comprises at least one prong arranged to align a fluid connector of the fluid connection.

8. The connection verifier as recited in claim 6, wherein each of the one or more engagement members comprises:
- a first prong; and
- a second prong adjacent the first prong, wherein the first and second prongs are arranged to align a fluid connector of the fluid connection.

9. The connection verifier as recited in claim 6, wherein each of the one or more engagement members comprises:
- a first prong having a first length;
- a second prong adjacent the first prong and having a second length, the second length being shorter than the first length; and
- a third prong adjacent the second prong and having a third length, the third length being greater than the first length, wherein the first, second, and third prongs are arranged to align a fluid connector of the fluid connection.

10. The connection verifier as recited in claim 6, wherein the second outer shell is arranged at an angle relative to the first outer shell.

11. The connection verifier as recited in claim 6, wherein the second inner shell forms an opening arranged to engage a tube end form of the fluid connection.

12. A connection verifier, comprising:
- a handle, including:
  - a first end;
  - a second end;
  - a first outer shell; and
  - a first inner shell connected to the first outer shell;
- a head, including:
  - a third end connected to the second end;
  - a fourth end;
  - a second outer shell; and
  - a second inner shell connected to the second outer shell and having a cutout;
- an engagement plate, including:
  - a first surface connected to the fourth end;
  - a second surface; and
  - one or more engagement members connected to the second surface and arranged to engage a fluid connection; and
- one or more cameras arranged:
  - radially between the first outer shell and the first inner shell; and
  - in a direction of the cutout to view the fluid connection.

13. The connection verifier as recited in claim 12, wherein each of the one or more engagement members comprises at least one prong arranged to align a fluid connector of the fluid connection.

14. The connection verifier as recited in claim 12, wherein each of the one or more engagement members comprises:
- a first prong having a first length;
- a second prong adjacent the first prong and having a second length, the second length being shorter than the first length; and
- a third prong adjacent the second prong and having a third length, the third length being greater than the first length, wherein the first, second, and third prongs are arranged to align a fluid connector of the fluid connection.

15. The connection verifier as recited in claim 12, wherein the engagement plate comprises a radially inward facing surface:
- offset from the first inner shell; and
- arranged at an angle relative to the first outer shell, wherein in the angle is greater than or equal to 0 degrees and less than or equal to 90 degrees.

16. The connection verifier as recited in claim 15, wherein the second inner shell and the radially inward facing surface form an opening arranged to engage a tube end form of the fluid connection.

17. The connection verifier as recited in claim 12, further comprising at least one light directed toward the cutout.

18. The connection verifier as recited in claim 12, wherein the handle, the head, and the engagement plate are integrally formed.

* * * * *

UNITED STATES PATENT AND TRADEMARK OFFICE
CERTIFICATE OF CORRECTION

Page 1 of 1

PATENT NO. : 11,994,475 B2
APPLICATION NO. : 17/253665
DATED : May 28, 2024
INVENTOR(S) : Thomas Edwin Hall, II and Lawrence Butts

It is certified that error appears in the above-identified patent and that said Letters Patent is hereby corrected as shown below:

On the Title Page

Item (12) should read "Hall, II et al.".

Item (72) should read "Thomas Edwin Hall, II".

Signed and Sealed this
Twenty-fourth Day of September, 2024

Katherine Kelly Vidal
*Director of the United States Patent and Trademark Office*